United States Patent [19]

Muka

[11] Patent Number: 4,651,169
[45] Date of Patent: Mar. 17, 1987

[54] LASER PRINTER FOR PRINTING A PLURALITY OF OUTPUT-IMAGES SIZES

[75] Inventor: Edward Muka, Rochester, N.Y.

[73] Assignee: Eastman Kodak Company, Rochester, N.Y.

[21] Appl. No.: 719,091

[22] Filed: Apr. 2, 1985

[51] Int. Cl.$^4$ .............................................. G01D 9/42
[52] U.S. Cl. ...................................... 346/108; 355/56; 358/293
[58] Field of Search .................. 346/107 R, 108, 160, 346/1.1; 358/293, 300, 302, 296; 350/320, 6.8; 355/44, 45, 54, 55, 56, 57

[56] References Cited

U.S. PATENT DOCUMENTS

| | | | |
|---|---|---|---|
| 3,657,471 | 4/1972 | Sasabe et al. | 346/109 |
| 4,089,008 | 5/1978 | Suga et al. | 354/5 |
| 4,129,377 | 12/1978 | Miyamoto | 355/55 |
| 4,247,160 | 1/1981 | Brueggemann | 350/6.8 |
| 4,279,002 | 7/1981 | Rider | 358/300 |
| 4,293,202 | 10/1981 | Ohnishi et al. | 354/5 |
| 4,308,544 | 12/1981 | Lucero et al. | 346/108 |
| 4,342,050 | 7/1982 | Traino | 358/256 |
| 4,390,882 | 6/1983 | Ohara et al. | 346/1.1 |

Primary Examiner—E. A. Goldberg
Assistant Examiner—Mark Reinhart
Attorney, Agent, or Firm—Raymond L. Owens

[57] ABSTRACT

A multi-format laser printer is disclosed which uses a constantly rotating polygon to line scan an intensity modulated beam of laser light across an image zone. Optical means, which include a cylindrical mirror are provided for causing first and second beam spot sizes to be in focus at the image zone. The first beam spot size is selected to be in focus for a first range of line scan lengths and the second beam spot size is selected to be in focus for at least one predetermined line scan length not in such range. The line scan length in the first range is adjusted by changing the periodicity of modulation of the laser beam. The velocity of the photosensitive member is adjusted to change the length of the output image in the page scan direction.

6 Claims, 2 Drawing Figures

LASER PRINTER FOR PRINTING A PLURALITY OF OUTPUT-IMAGES SIZES

FIELD OF THE INVENTION

The present invention relates to apparatus for changing output image format sizes in laser printers such as those which use multi-faceted rotating polygon scanners.

BACKGROUND OF THE INVENTION

Many optical printers use a laser scanning process. The intensity of a laser light beam focused on a two-dimensional photosensitive surface is modulated as the beam is moved relative to such surface to provide a two-dimensional output image at an image zone. In one common system, a constantly rotating multi-faceted polygon is used to line scan a beam of light from the laser across a photosensitive member at the image zone. An acoustooptic modulator intensity modulates the beam in accordance with the gray or brightness level of pixels of a digital image held in a frame store memory. The rotating polygon has the advantages of high generation rates, high resolution and relatively maintenance-free operation.

Prior laser printers usually print only one format size. See for example, U.S. Pat. Nos. 4,040,096 and 4,247,160. These laser printers employ a constantly rotating polygon scanner which scans a fixed line length and uses a fixed number of pixels. In order to change format size, the print must be capable of changing spot size at the image zone, line scan length and page length and these features are costly and difficult to implement in any one printer. Commonly assigned U.S. application Ser. No. 719,092 entitled "Multi-Format Printer" to Chandler et al filed 4-2-85, discloses an effective multi-format polygon laser printer which scans a beam across an image zone. This printer changes image format size. Each time the format size is changed, changes are made to the beam spot size. More particularly, a cylindrical mirror is moved to change the line scan length. The velocity of the photosensitive member is adjusted to change the page scan length.

SUMMARY OF THE INVENTION

The object of the invention is to change image format size produced by a scan printer without having to change the beam spot size every time the image format size is changed.

This object is achieved by using a constantly rotating polygon laser printer which line scans an intensity modulated beam across a photosensitive member at an image zone. The printer includes (a) optical means including cylindrical mirror means effective in a first state for producing a first beam spot size in focus at the image zone for a range of line scan lengths and in a second state for producing a second beam spot size in focus at the image zone for at least one predetermined line scan length not in such range; (b) means for changing the line scan length including means for changing the periodicity of modulation of the laser light beam to adjust the line scan length in the first range; and (c) means for changing the velocity of the photosensitive member to change the length of the output image formed on the photosensitive member in the page scan direction.

The optical means includes a movable cylindrical mirror movable between two positions to change line scan lengths and optic elements to change the beam spot size each time the mirror is moved to keep the beam in focus at the image zone. The angular velocity of the polygon is kept constant. It has been determined that a sharp in-focus beam spot at the image zone will remain in focus over a range of line scan lengths. When this range is exceeded, only then must the beam spot size be adjusted. By changing the periodicity of modulation of the laser beam, the line scan length in the range of line scan lengths is changed without changing the first beam spot size.

In accordance with the invention, it has been determined if a predetermined spot size is used, a small range or interval of line scan lengths can be used where the loss in image sharpness will not be observable.

DESCRIPTION OF THE PREFERRED EMBODIMENT

As used herein, the terms "anamorphic" and "astigmatic" are interchangeable. They generally refer to a gaussian laser light beam which is compressed or expanded along one direction relative to another perpendicular direction. The term "image size" refers to the area of a two-dimensional output image at an image zone.

Figure 1:
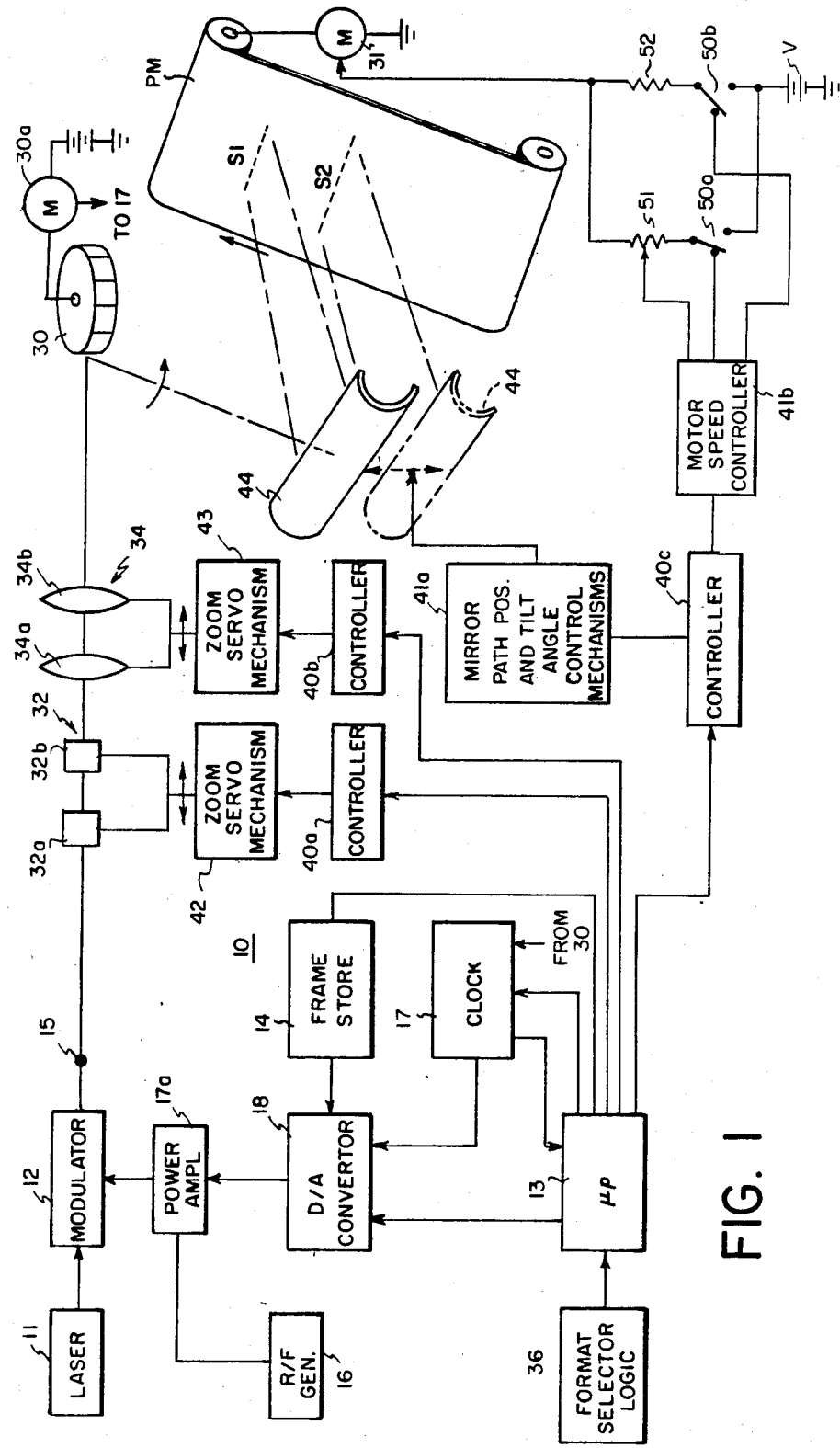
FIG. 1 is a diagram, partially in block and partially in schematic form, of a laser printer embodying apparatus for changing the output image or format size.

In FIG. 1, there is shown a laser printer 10 which includes at least one laser 11 for producing a beam of gaussian light, and a modulator 12. The beam is information modulated or discretized in brightness by the modulator 12 which may for example be a single beam acoustooptic modulator. Modulator 12 may include a transparent cell which is made of an acoustooptic material such as glass or $TeO_2$ crystal and a piezoelectric transducer bonded to the cell. A radio frequency (R/F) signal is produced by an R/F generator 16. This signal at a predetermined frequency, usually in the range of 40–300 MHz, is applied to the transducer by way of a power amplifier 17a. The power amplifier scales the amplitude of the R/F signal. The transducer launches acoustic waves in the cell which produce sonic compression waves that create a diffraction wave grating.

This diffraction grating causes a portion of the input laser light beam passing through the cell to be diffracted out of its original path. Amplitude changes of the RF signal caused by the power amplifier 17a cause intensity modulation of the diffracted (first-order) and undiffracted (zero-order) beams. The intensity of the modulated diffracted light beam varies in response to RF signal amplitude. The modulated diffracted light beam, rather than the undiffracted beam, is utilized, e.g. applied to a deflector which, as will be discussed shortly, is a polygon that converts the modulated light beam into a line scan.

A microprocessor (µp) 13 in response to a clock signal produced by a clock 17 provides a signal to a frame store memory 14 which periodically causes the gray or brightness digital level of pixels of a digital image stored in the frame store memory 14 to be applied to a D/A converter 18. Converter 18 provides control signals to power amplifier 17a. The power amplifier 17a adjusts the amplitude level of the RF signal in response to the analog signal representative of the brightness of a pixel produced by D/A converter 18. The timing of the operation of the D/A converter 18 is provided by a clock signal from clock 17. The periodicity of modulation of the laser light beam produced by laser 11 is controlled by the frequency of the clock signal. This arrangement produces a modulated circularly symmetrical beam of gaussian light at position 15. The digital image can be provided in a number of ways such as by scanning a beam of light through a negative onto a photodetector which provides outputs representative of the gray or brightness level of image pixels. These levels are digitized and stored in frame store memory 14.

A scanning polygon 30 has a plurality of mirror facets. The operative facet deflects the modulated light beam and line scans it across a photosensitive member located at an image zone. Preferably, the polygon 30 is driven at a constant angular velocity by a motor 30a. The polygon 30 can be mounted on an air spindle. The polygon 30 drives a shaft encoder (not shown) which provides an input signal to the clock 17 representative of the beam position in the line scan. In response to this input signal and a signal produced by the microprocessor 13, the clock 17 is turned on and off at the desired line scan length. The line scan length is selected by an operator and provided as an input to selector logic 36. The periodicity of the clock signal is adjusted by the clock 17 as a function of the line scan length. For example, with shorter line scan lengths, the frequency of the clock signal must be increased to have the same number of pixels per line scan.

As the beam is line scanned by an operative one of the mirror facets of the polygon 30, the beam forms an output image on the photosensitive member. The term "photosensitive member" will be understood to include a photographic film, photographic paper, a photoconductor used in a copier/duplicator and any other means responsive to a source of light to produce a visible output image. The elements of this output image are also called pixels. The photosensitive member is continuously driven in the page scan direction by a variable speed DC motor 31. The beam is line scanned at a much higher speed than the speed of the photosensitive member. It will be understood that the light beam need not be monochromatic but can also be polychromatic if the apparatus is to produce colored prints. The operation of polygons, lasers, optics, and modulators are well understood in the art. For a more complete description of their operations, see Urbach et al, "Laser Scanning for Electronic Printing", Proceedings of the IEEE, 597 (June, 1982).

As will be discussed below, there are two ways the line scan length is changed. The first is to move a cylindrical mirror to a new position and then adjust optical elements to shape the beam to be in focus at the image zone. Small changes can be made in the line scan length without the need to make adjustments to the optical means. In other words, within a range of line scan lengths the beam will remain in focus. Changes are made to the line scan length by adjusting the frequency of modulation of the laser light beam. Thus, for a given number of pixels, increasing the frequency will decrease the line scan length. The dimension of the output image in the page scan direction is changed by adjusting the velocity of the photosensitive member.

Between position 15 and the polygon 30, there are two anamorphic beam shaping zoom lens systems 32 and 34 respectively. Each of these zoom lens systems has two cylindrical lenses. Zoom lens system 32 has cylindrical lenses 32a and 32b. Zoom lens system 34 has cylindrical lenses 34a and 34b. The line scan zoom lens system 34 is positioned at all image format sizes to shape the circularly symmetrical beam (at position 15) so that the beam's waist in the line scan direction is always near or adjacent to the image zone. The page scan zoom lens system 32 shapes the beam so that at all image format sizes the beam's waist in the page scan direction is formed near or adjacent to the operative polygon facet. Since no optical magnification power exists in the line scan direction between the reflective mirror facets on the polygon or a cylindrical mirror 44 (to be described shortly) and the photosensitive member, the beam size (spot size) in the line scan direction at the image zone is adjustable only by zoom lens system 34. Lens system 32 in combination with the concave cylindrical mirror 44, adjusts the beam size (spot size) in the page scan direction at the image zone so that the beam spot of the light incident on the photosensitive member is substantially circularly symmetrical. Exact circular symmetry may not be necessary to provide acceptable image quality.

The cylindrical mirror 44 also provides pyramidal error correction as will be described later. The beam spot size is adjusted for two positions of the mirror 44. At any given output image size, it is highly desirable that the beam spot size be maintained sufficiently constant as it is line scanned at the image zone to provide a high modulation transfer function (MTF) for sharp prints. In the line scan direction, this does not create a problem if the beam's waist is kept adjacent to the image zone. For laser printers of the type described using up to about 1500 spots in scan line lengths of about 100 mm, once the zoom lens system 34 has been positioned, there is a very small spot size change of the beam along the length of the line scan at the image zone. The spot size change that does occur will not significantly alter the line scan MTF. Analysis of system MTF and acutance shows that the printer spot size is not a critical factor on the sharpness of color prints over a small range or interval of line scan lengths. Accordingly, if it is desired to produce prints of 3¼, 3½ and 4 inches wide (line scan lengths), then apparatus in accordance with the invention may, for example, use an optical scan of 4 inches with a spot size in focus at the image zone for the 3½ inch scan length or even the 3¼ inch scan length. Thus in accordance with the invention, if the polygon 30 is continued to be rotated at a constant velocity, mirror 44 stays at position $A_1$, (see FIG. 2), only the frequency of the clock 17 need be changed to change the line scan length. If the range of line scan lengths is kept within a small interval, then the spot size will remain in focus at the image zone. In other words, a sharp image will be formed on the photosensitive member at the image zone.

In order to change the dimensions of the output image (format size), an operator provides an input into the format selector logic 36. Logic 36 provides a digital input to a microprocessor 13 which provides control signals to the frame store 14, the clock 17, and controllers 40a, 40b and 40c. The operation of the clock 17 has been discussed above. Controllers 40a and 40b respectively control the zoom lens systems 32 and 34 using drive zoom servo mechanisms 42 and 43 respectively. Controller 40c controls mirror path position and tilt angle control mechanisms 41a and a motor speed controller 41b. Control mechanisms 41a control the cylindrical mirror 44 path position and tilt angle. Controller 41b controls the page scan drive mechanism that moves the photosensitive member.

Both mechanisms 42 and 43 will be understood to include two separate adjustment mechanisms. The first adjustment mechanism moves both the cylindrical lenses as a unit to a new position along the optical path and the second adjustment mechanism controls the spacing between the lenses. For example, as discussed above, zoom lens system 34 is adjusted by mechanisms 43 to shape the beam to form a beam waist in the line scan direction adjacent to member for each different output image format size. If, for example, the distance between the polygon 30 and the photosensitive member is increased by moving mirror 44 from position $A_1$, to position $A_2$ (see FIG. 2) controller 40b will provide an input signal to mechanisms 43 which moves both lenses 34a and 34b to a new path position closer to position 15 and then adjusts the spacing between these lenses. In its new position, zoom lens system 34 changes the beam spot size in the line scan direction. The mirror 44 in a new path position, varies the beam spot size in the page scan direction at the image zone. To shape the page scan spot size, the controller 40a repositions the zoom lens system 32 to shape the beam so that a generally circularly symmetric beam spot is provided at the image zone. In general, the larger the output image size, the larger the desired spot size.

To this end, the controller 40c, in response to signals from the microprocessor 13, provides control signals to motor speed controller 41b. Controller 41b adjusts the velocity of variable speed motor 31 and thereby changes the output image in the page scan direction or dimension. With mirror 44 at position $A_1$, controller 41b closes switch 50a and opens switch 50b. A source of DC voltage shown as battery V applies a voltage across the motor 31. The applied voltage is scaled by adjustable resistor 51, the resistance of which is adjusted as a function of desired page scan size.

Figure 2:
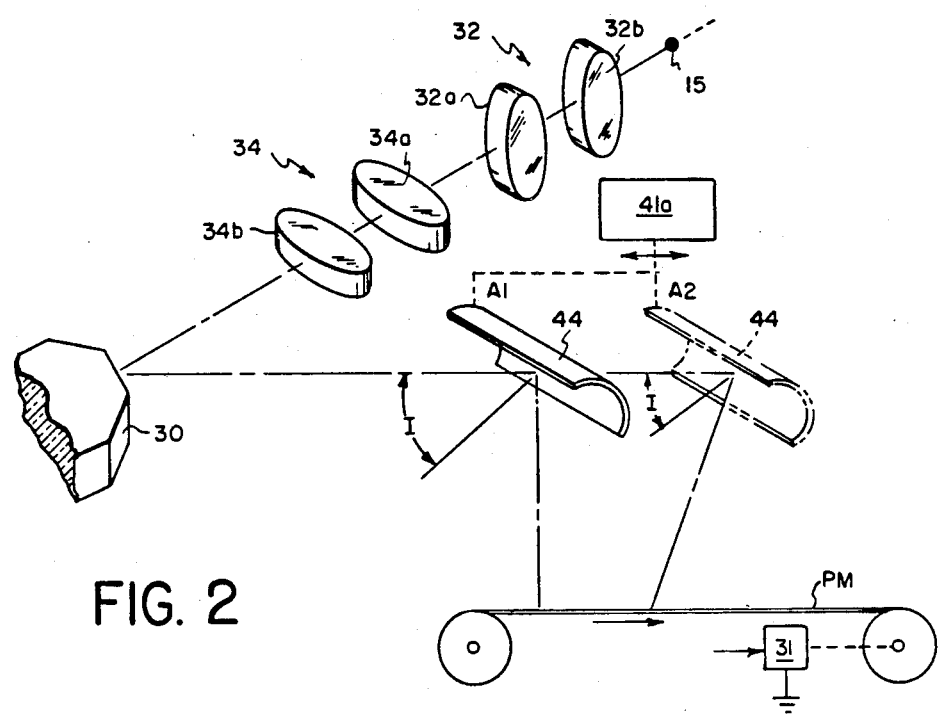
FIG. 2 shows a side perspective of the laser printer of FIG. 1.

When the mirror 44 is at position $A_1$, as shown in FIG. 2, the line scan has a length $S_1$ for a predetermined spot size. For a specific example, this spot size could be for a line scan length of $3\frac{1}{2}$ inches. If, for example, a print of $3\frac{1}{4}$ inches line scan length is desired, the spot size is not changed but the frequency of the clock 17 is increased. For a line scan length of 4 inches, the clock frequency is reduced. When line scan lengths are to be produced within a first range (using the first spot size where it remains in focus at the image zone), the controller 41b opens switch 50b and close switch 50a. It also adjusts the value of resistor 51 to change the page scan lengths of the output image.

When the mirror 44 is moved for example from position $A_1$ to position $A_2$, (the line scan length is a predetermined length shown as $S_2$, where $S_2$ is greater than $S_1$), the controller 41b, applies a higher voltage across motor 31. The resistor 52 has a lower resistance than resistor 51. To operate at line scan length $S_2$, the controller 41b opens switch 50a and closes switch 50b. The velocity of the motor 31 is increased. When the mirror 44 is at its position $A_2$, only one possible line scan length has been disclosed. It will be understood that a small range of line scans could also be used by adjusting the frequency of clock 17, provided the spot size remains in focus at the image zone.

Each facet mirror on the polygon 30 when not perfectly assembled can have a tilt or pyramidal angle error which causes pixel position error in the page scan direction to be introduced into a light beam at the image zone. Artifacts produced in the image which are a result of pyramidal errors are known as "banding". The cylindrical mirror 44 (with power in only the page scan direction) makes optically conjugate the operative polygon facet and the image zone. In other words, mirror 44 forms an image of the operative facet of polygon 30 at the image zone in the page scan direction. This conjugation process corrects for pyramidal errors.

For a more complete discussion of polygon pyramidal errors and the theory behind their correction, see the above-referred to article in the Proceedings of the IEEE by Urbach et al.

I claim:

1. In a multi-format scan printer including a constantly rotating polygon for line scanning an intensity modulated laser beam across a moving photosensitive member at an image zone, the improvement comprising:
    (a) optical means including cylindrical mirror means effective in a first state for producing a first beam spot size in focus at the image zone for a range of line scan lengths and in a second state for producing a second beam spot size in focus at the image zone for at least one predetermined line scan length not in such range;
    (b) means for changing the line scan length including means for changing the periodicity of modulation of the laser light beam to adjust the line scan length in the first range; and
    (c) means for changing the velocity of the photosensitive member to change the length of the output image formed on the photosensitive member in the page scan direction.

2. In a multi-format laser printer including a constantly rotating polygon for line scanning a beam of laser light across an image zone, in accordance with the length of line being scanned, the improvement comprising:
    (a) optical means for selectively producing first and second beam spot sizes which are in focus at the image zone;
    (b) cylindrical mirror means for adjusting the line scan length to provide first and second line scan lengths where the first and second beam spot sizes are respectively in focus at the image zone; and
    (c) means for changing the periodicity of intensity modulation of such scanned light beam to change the line scan lengths.

3. In a scan printer including a movable mirror for line scanning a light beam across an image zone, the improvement comprising:
    (a) adjustable means for varying the length of a line scan of the beam of light at the image zone including means for changing the periodicity of modulation the intensity of the light beam as it is scanned;
    (b) optical means effective in a first state for producing a first beam spot size at the image zone which produces a sharp image at such zone for a first range of line scan lengths, and effective in a second state for producing a second beam spot size at the image zone which produces a sharp image for at least one predetermined line scan length outside the first range of line scan lengths; and
    (c) means coupled to said adjustable means and said optical means for selectively causing (i) said adjustable means to produce a first or a second line scan length within said first range and said optical means to be effective in said first state, and (ii) said adjustable means to produce said predetermined line scan length and said optical means to be effective in said second state.

4. A laser printer comprising: a memory for storiong a predetermined number of brightness level pixels representing a scan line, a constantly rotating polygon for line scanning a beam of laser light across an image zone; adjustable means for periodically intensity modulating said light beam in accordance with the stored pixel brightness levels, the modulation periodicity being selected to change the line scan length at the image zone; optical means effective in a first state for producing a first beam spot size at the image zone which produces a sharp image at the image zone for a first range of line scan lengths, and effective in a second state for producing a second beam spot size at the image zone which produces a sharp image at the image zone for a predetermined line scan length outside said first range; and means for adjusting said adjustable means causing it to change the periodicity of modulation of the intensity of the laser light beam while said optical means is in said first state to effect a change in said first line scan length to be still within said first range without changing said first spot size, such that a sharp image is produced at the image zone.

5. The invention as set forth in claim 4, wherein said optical means includes a cylindrical mirror which provides pyramidal error correction in said first and second states.

6. In a laser printer comprising: a memory for storing pixels representing brightness levels; a constantly rotating polygon for line scanning a beam of laser light across an image zone; adjustable means for periodically intensity modulating said light beam in accordance with the stored pixel brightness levels, optical means providing pyramidal error correction in first and second states, said optical means including a cylindrical mirror movable to be effective in said first state for producing a first beam spot size at the image zone which produces a sharp image at the image zone for a first range of line scan lengths, and said mirror being effective in said second state for producing a second beam spot size at the image zone which produces a sharp image at the image zone for a predetermined line scan length not in said first range; and means coupled to said adjustable means and said optical means for selectively causing (i) said adjustable means to produce a first or a second line scan length within said first range and said optical means to be effective in said first state, and (ii) said adjustable means to produce said predetermined line scan length and said optical means to be effective in said second state.

* * * * *